(12) United States Patent
Petter et al.

(10) Patent No.: US 12,484,501 B2
(45) Date of Patent: *Dec. 2, 2025

(54) GARLIC VARIETY 'BGS 352'

(71) Applicants: Bejo Zaden B.V., Warmenhuizen (NL); De Groot en Slot B.V., Broek op Langedijk (NL)

(72) Inventors: Timo Christiaan Petter, Warmenhuizen (NL); Lennaert Crispijn Aardse, Broek op Langedijk (NL)

(73) Assignees: Bejo Zaden B.V., Warmenhuizen (NL); De Groot en Slot B.V., Broek op Langedijk (NL)

( * ) Notice: Subject to any disclaimer, the term of this patent is extended or adjusted under 35 U.S.C. 154(b) by 288 days.

This patent is subject to a terminal disclaimer.

(21) Appl. No.: 18/329,290

(22) Filed: Jun. 5, 2023

(65) Prior Publication Data

US 2024/0397892 A1    Dec. 5, 2024

(51) Int. Cl.
*A01H 6/04* (2018.01)
*A01H 5/06* (2018.01)

(52) U.S. Cl.
CPC ............... *A01H 6/04* (2018.05); *A01H 5/06* (2013.01)

(58) Field of Classification Search
None
See application file for complete search history.

(56) References Cited

U.S. PATENT DOCUMENTS 8,697,359 B1    4/2014    Zhang

FOREIGN PATENT DOCUMENTS

WO    2014076249 A1    5/2014

OTHER PUBLICATIONS

Fehr ((1997) Principles of Cultivar Development vol. 1 Theory and Technique and vol. 2 Crop Species, Soybean, pp. 360-376. (Year: 1997).*
Wijnker et al., "Hybrid recreation by reverse breeding in *Arabidopsis thaliana*," Nature Protocols, 2014, pp. 761-772, vol. 9.

* cited by examiner

*Primary Examiner* — Charles Logsdon
(74) *Attorney, Agent, or Firm* — The Webb Law Firm

(57) ABSTRACT

Provided herein is garlic variety 'BGS 352,' including seeds thereof and methods of using the variety to generate additional garlic varieties. The variety is characterized by its color, size, and shape.

16 Claims, 4 Drawing Sheets

| female ♀ pool | | male ♂ pool |
|---|---|---|
| ↓ | | ↓ |
| ♀ individual nr 11 | | ♂ individual 103 |
| maintaining and increasing ♀ line nr 11 | | |
| maintaining and increasing ♀ line nr 11 | | ↓ |
| maintaining and increasing ♀ line nr 11 | | Increasing ♂ 103 |
| maintaining and increasing ♀ line nr 11 | | |
| maintaining and increasing ♀ line nr 11 | | ↓ |
| maintaining and increasing ♀ line nr 11 | | maintaining ♂ 103 |
| maintaining and increasing ♀ line nr 11 | | |
| maintaining and increasing ♀ line nr 11 | | ↓ |
| maintaining and increasing ♀ line nr 11 | | maintaining ♂ 103 |
| maintaining and increasing ♀ line nr 11 | | |
| maintaining and increasing ♀ line nr 11 | | ↓ |
| | | maintaining ♂ 103 |
| Making cross ♀ line nr 11 | X | ♂ line nr 103 |
| | ↓ | |
| | ↓ | |
| | ↓ | |
| Decision making Exp BGS 352 F1 | | |

*FIG. 4*

GARLIC VARIETY 'BGS 352'

BACKGROUND OF THE INVENTION

Field of the Invention

Provided herein is a new variety of *Allium sativum*.

Description of Related Art

Garlic (*Allium sativum*) is an important crop, widely used in the cuisines of a variety of cultures. Moreover, garlic is known to have a number of beneficial effects, including in atherosclerosis, blood pressure reduction, thrombus formation, and inhibition of platelet formation.

SUMMARY OF THE INVENTION

Provided herein is a seed of garlic variety 'BGS 352,' wherein a representative sample of seed of said variety was deposited under NCIMB Accession No. 43999.

Also provided herein are plants grown from seed of variety 'BGS 352', and plant parts and seeds produced by plants so grown.

Also provided herein are methods of generating offspring of variety 'BGS 352', including the steps of crossing a plant of variety 'BGS 352' with a second variety of garlic plant. In some embodiments, both plants are variety 'BGS 352'. In other embodiments, the second variety is selected for a desired trait which can be introduced into offspring, such that said offspring include physiological/morphological traits of variety 'BGS 352' and the desired trait(s) of the second variety.

BRIEF DESCRIPTION OF THE DRAWINGS

FIG. 4 shows the breeding history of the new variety.

DESCRIPTION OF THE INVENTION

Figure 1:
FIG. 1 shows a close-up view of bulbs of the new variety.

In the description which follows, a number of terms are used. To provide a clear and consistent understanding of the specification and claims, including the scope to be given for such terms, the following definitions are provided:

Amplified Fragment Length Polymorphism (AFLP®): A PCR-based method of identifying polymorphisms through digestion with known restriction enzymes, followed by visualization through use of radiography or fluorescence.

Allele: The allele is any of one or more alternative forms of a gene, all of which relate to one trait or characteristic. In a diploid cell or organism, the two alleles of a given gene occupy corresponding loci on a pair of homologous chromosomes.

Backcrossing: Backcrossing is a process in which a breeder repeatedly crosses hybrid progeny back to one of the parents, for example, a first generation hybrid F1 with one of the parental genotype of the F1 hybrid.

BC1: First backcross generation.

Cleaved Amplified Polymorphic Sequence (CAPS): A method of identifying genetic markers based on the length of restriction fragment lengths. Restriction fragments analyzed using CAPS are typically generated using a Restriction Fragment Length Polymorphism assay.

Cotyledon: One of the first leaves of the embryo of a seed plant, typically one or more in monocotyledons, two in dicotyledons, and two or more in gymnosperms.

Clustered Regularly Interspaced Short Palindromic Repeats (CRISPR): Refers to DNA sequences found in bacteria that include portions of DNA introduced to the bacteria by a given virus. The concept is the basis of the CRISPR system of editing an organism's genome (see, e.g., U.S. Pat. No. 8,697,359, incorporated herein by reference in its entirety).

CRISPR-Associated System (CAS): A set of homologous genes, encoding enzymes, that reside in the genome near the site of CRISPR sequences. These enzymes target DNA sequences based on similarity to the viral sequences included in the CRISPR regions.

Embryo: A plant embryo is a portion of the seed including precursors of the leaves, stem, and root, and one or more cotyledons.

F1, F2, F3 etc.: First, second, third, etc. filial generation of offspring of distinctly different parental types.

First water date: The date the seed first receives adequate moisture to germinate. This can and often does equal the planting date.

Gene: As used herein, "gene" refers to a segment of nucleic acid. A gene can be introduced into a genome of a species, whether from a different species or from the same species, using transformation or various breeding methods.

Genetically Modified Organism (GMO): An organism whose genome has been altered using some form of genetic engineering.

Hypocotyl: The portion of the stem of an embryo plant beneath the cotyledons, but above the root.

Marker-assisted recurrent backcrossing (MARB): A method of introducing a single locus of interest. The MARB method allows for maintenance of essential characteristics of the recurrent parent's genome. MARB is particularly effective for Quantitative Trait Loci (QTLs) that are highly variable.

Marker-assisted selection (MAS): A method of selecting a trait of interest based not on the trait, but on a marker associated with that trait.

Maturity date: Maturity refers to the stage when the plants are of full size or of optimum weight, in marketable form or in shape to be of commercial or economic value.

Meristematic cell: Cells of the meristem, which is a collection of undifferentiated cells in the plant. Meristematic cells include apical meristematic cells and lateral meristematic cells.

*Peronospora destructor*: A plant pathogen that causes downy mildew on leaves of cultivated and wild *Allium*.

Pest: A bacterium, fungus, virus, insect, or animal that attacks or negatively affects a plant.

Plant: "Plant" includes plant cells, plant protoplasts, plant cells of tissue culture from which garlic plants can be regenerated, plant calli, plant clumps, and plant cells that are intact in plants, or parts of plants such as pollen, flowers, seeds, leaves, stems, and the like.

Promoter: A region of DNA upstream from the start of transcription and involved in recognition and binding of RNA polymerase and other proteins to initiate transcription. A "plant promoter" is a promoter capable of initiating transcription in plant cells.

Protoplast: A plant cell that has had its cell wall at least partially removed.

Quantitative Trait Loci (QTL): Refers to genetic loci that control, to some degree, numerically representable traits that are usually continuously distributed.

Random Amplified Microsatellite Polymorphism (RAMP): A PCR-based method of identifying polymorphisms through use of simple sequence repeat markers and random amplified DNA polymorphism markers. RAMP is particularly useful for assessing genetic relationships in plant species.

Random Amplified DNA Polymorphism: A PCR-based method of amplifying random sections of DNA.

Ratio of head height/diameter: Head height divided by the head diameter is an indication of the head shape wherein a value of <1 is flattened, 1=is round, and >1 is pointed.

Recurrent Parent: The backcross parent, and member of an identifiable lineage or line that is improved by addition of a trait not found in that line.

Regeneration: Regeneration refers to the development of a plant from tissue culture.

Resistance: The character of a plant to restrict or even inhibit the development of a pest or pathogen in or on the plant and also the restriction of damage these organisms may cause in comparison to a susceptible variety and under comparable circumstances.

Restriction Fragment Length Polymorphism (RFLP): A marker in homologous DNA, detectable based on fragments of different, specific lengths generated by known restriction enzymes.

Root tip: The terminal portion of the root of a plant.

Royal Horticultural Society of England (RHS): An organization that publishes an official botanical color chart quantitatively identifying colors according to a defined numbering system. The chart may be purchased from Royal Horticulture Society Enterprise Ltd., RHS Garden; Wisley, Woking; Surrey GU236QB, UK. As used herein, references to RHS color refer to those in the Sixth Edition (2019) of the chart.

Simple sequence repeats (SSR): A DNA sequence having a number of motifs that are repeated.

Single nucleotide polymorphism (SNP): A common nucleotide variation at a given locus among a given population.

Transgenic: An organism that contains genetic material from an unrelated organism that has been artificially introduced.

Garlic Variety 'BGS 352'

Figure 2:
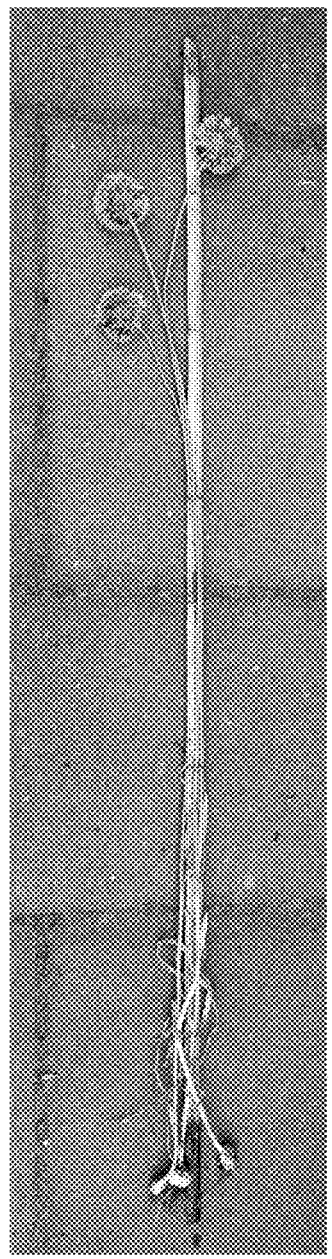
FIG. 2 shows freshly picked spears of the new variety.
Figure 3:
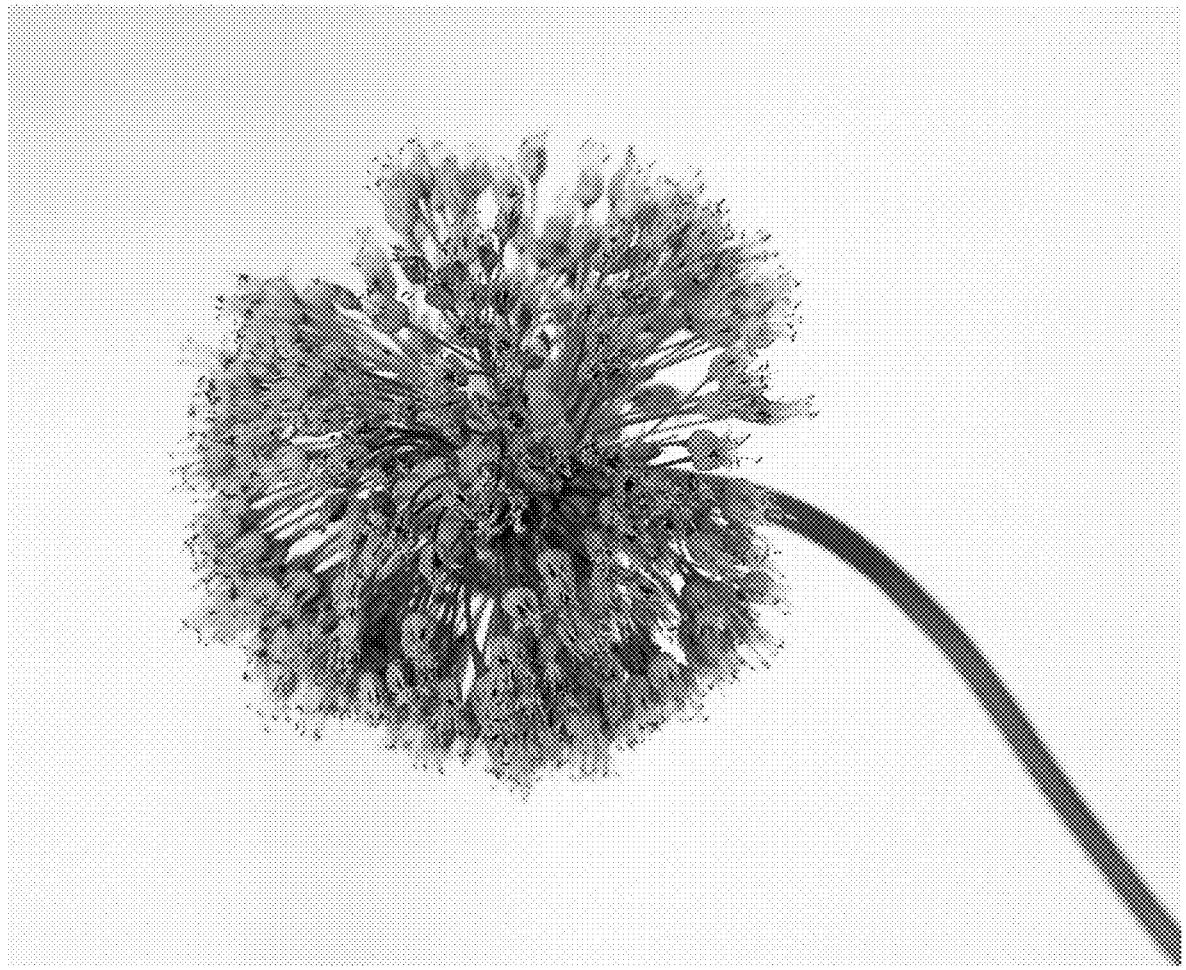
FIG. 3 shows a close-up view of an inflorescence of the new variety.

The following detailed description sets forth the characteristics of the new variety. Plants of the new variety were grown in well-drained, loamy, clay soil in the Netherlands under open field conditions under natural light. Growth conditions for 'BGS 352' were maritime climatic conditions in a long-day region with the sun at a 44° N sun angle and temperatures ranging from approximately 5 to 25° C. Planting of bulbs can occur as early as the middle of October, with the harvest of bulbs around the middle of June under Northern European conditions. Blooming following planting occurs around weeks 29-30. The color readings and measurements were taken in the Netherlands under natural light on close to one-year-old plants. Color references are primarily to the 2019 R.H.S. Colour Chart of The Royal Horticultural Society of London, Sixth Edition. Various aspects of the variety 'BGS 352' are shown in FIGS. 1-3.

Garlic variety 'BGS 352' is a seed and clone-propagated garlic, which is a single-cross hybrid. Garlic variety 'BGS 352' is similar to the variety 'Germidour', in that both are clone-propagated hybrids and exhibit suitability for storage. As used herein, "similar" or "similarity" is defined as the number of distinguishing characteristics that are the same between the two plants that are compared when grown under the same environmental conditions. Characteristics are considered "the same" when the value for a numeric characteristic is evaluated at significance levels of 1%, 5% or 10% significance level, or when a non-numeric characteristic is identical, if the plants are grown under the same conditions. With regard to this comparison, variety 'BGS 352' is also seed-propagated, while 'Germidour' is only clone-propagated. In addition, 'Germidour' does not have a pseudostem, while 'BGS 352' does, and the clove scales of 'Germidour' are brown, while the clove scales of 'BGS 352' are pink. When compared to other garlic varieties known to the Applicant, 'BGS 352' can be distinguished at least based on its pink clove scale color and having a pseudostem.

Breeding History

The breeding history of 'BGS 352' is shown in FIG. 4. Briefly, individuals that have shown some degree of flowering were selected from a population consisting of non-flowering or only bulbil-producing garlic in the Netherlands, and was selected continuously until a basic level of flowering and seed production abilities was achieved. Male-sterile and male-fertile individuals were separated into two pools. Thereafter, the females underwent clonal multiplication and selection (on an annual cycle), with selection for phenotype and flowering habit. This clonal multiplication was performed in the Netherlands, and selection was performed in the Netherlands. Males underwent mass selection (for phenotype and flowering habit) in Spain and mass mating and seed production of selected individuals in Italy (a 3-year cycle). Thereafter, a test cross between a female parent line and a male parent line was made in Italy and tested in moderate and hot climate areas. Based on multiple-year results, this specific hybrid (♀ line 11×♂ line 103) performed very well and was appointed as the new variety.

A deposit of seeds of 'BGS 352' as disclosed above and recited in the appended claims has been made with the National Collections of Industrial, Food and Marine Bacteria (NCIMB), located in Ferguson Building, Craibstone Estate, Bucksburn, Aberdeen AB21 9YA, United Kingdom. The date of the deposit was Jul. 22, 2022. All restrictions will be irrevocably removed upon granting of a patent, and the deposit is intended to meet all of the requirements of 37 C.F.R. § 1.801-1.809. The NCIMB Accession Number is 43999. The deposit will be maintained in the depository for a period of thirty years, or five years after the last request, or for the enforceable life of the patent, whichever is longer, and will be replaced as necessary during that period.

Botanical Description

Growth Habit: Narrow and Upright.
  Arrangement: An inflorescence is located at the top of a single stem growing from the base where the bulbs and roots are present.
  Height:
    Soil level to top of foliar plane: Average of 67.0 cm.
    Soil level to top of floral plane: Average of 127.0 cm.
  Spread: Average of 16.5 cm.
  Rooting: Fibrous.
  Productivity of plant (average weight per acre): Approximately 4,900 kg/acre.
  End of dormancy of cloves in bulb: Around the end of December, depending on storage conditions.
  Emergence speed after planting: Slow development after transplanting, depending on weather conditions.
  Disease/pest resistance/susceptibility: Nothing unusual observed to date.
Leaves:
  Number: Varies between 4 to 6.
  Length: Average of 22.8 cm (excluding the sheath).
  Width: Average of 0.8 cm.

Aspect: Slight to moderately arching.
Shape: Ligulate.
Base: Sheathing present.
Apex: Narrowly acuminate.
Venation: Parallel.
Margin: Minutely dentate, with teeth smaller than 0.1 mm.
Fragrance: Very faint, somewhat garlic-like, and sweet.
Attachment and arrangement: Along the flowering stem and alternate.
Texture:
  Upper surface: Smooth, glabrous, and with no pubescence present. A very thin waxy layer of RHS 191B covers the surface.
  Lower surface: Smooth, glabrous.
Color:
  Upper surface: RHS 144A.
  Lower surface: RHS 137B to 137C.
Bulbs:
  Transverse section shape: Broadly elliptic.
  Shape of apex: Narrowing.
  Shape of base: Rounded.
  Length: Average of 3.5 cm.
  Diameter: Average of 2.1 cm.
  Color of dry external scales: A blend of 155A and 158D.
  Dry external scale texture: Smooth, glabrous.
Cloves:
  Shape: Flattened on one side and rounded on the other.
  Length: Average of 3.1 cm.
  Diameter: Average of 1.8 cm at widest point; average of 1.2 cm at narrowest point.
  Color of scale: RHS 160D, with the flattened side fading to RHS 186A, and RHS 187C and 187D at the base.
  Taste: Typical garlic.
  Smell: Typical garlic.
  Eating quality: Good.
  Keeping quality: Good.
Inflorescence/Flowers:
  Inflorescence type: Umbel.
  Flowering time: July/August in the Netherlands.
  Inflorescence number per stem: 1.
Inflorescence:
  Shape: Flattened globular.
  Number of flowers: Average of 400.
  Height: Average of 6.2 cm (excluding the peduncle).
  Diameter: Average of 7.0 cm.
  Fragrance: Very faint, somewhat garlic-like, and sweet.
Flower Bud:
  Length: Average of 3.25 mm.
  Width: Average of 1.5 mm.
  Shape: Obovate; triangular in cross-section.
  Color: RHS 70C.
Flower:
  Form: Single.
  Length: Average of 0.6 cm.
  Width: Average of 0.4 cm.
Petals: Not present. The perianth consists of only single whorls of tepals. There are no separate petals and sepals.
Tepals:
  Number: Average of 6 per flower.
  Shape: Ovate and slightly concave.
  Length: Average of 3.5 mm.
  Width: Average of 1.25 mm.
  Apex: Acute.
  Base: Broadly cuneate.
  Margin: Entire.
  Color:
    Upper surface: RHS 77D, fading lighter at the base.
    Lower surface: RHS 77C, fading to 77D at the base.
  Texture (both surfaces): Smooth, glabrous.
Flower Stem:
  Length: Average of 118.0 cm.
  Diameter: Average of 0.5 cm.
  Surface: Smooth, glabrous texture covered with a very thin waxy layer of RHS 191C.
  Slight gloss is present, but not visible due to the waxy layer.
  Color: RHS 145A.
Pedicels:
  Length: Average of 2.5 cm.
  Width: Average: 0.75 mm.
  Surface: Smooth, glabrous, and moderately glossy.
  Strength: High.
  Color: Slightly lighter than RHS 186D, fading to RHS 143A and 143B at the proximal and distal ends, respectively.
Gynoecium:
Pistils:
  Number: Average of 1.
  Length: Average of 4.0 mm.
Stigma:
  Width: Average of 0.2 mm.
  Color: RHS NN155D.
Styles:
  Length: Average of 3.5 mm.
  Color: RHS NN155D.
Ovary:
  Diameter: Average of 0.35 cm.
  Color: RHS 146B with RHS 145C veins.
Androecium:
Stamens:
  Number: Average of 6 with the filament epipetalous.
  Shape: Laciniate.
Anthers:
  Length: Average of 0.5 mm.
  Color: RHS 161B.
  Pollen: Low amount present.
Filaments:
  Length: Average of 3.0 mm.
  Color: RHS NN155D.
Seeds: Not present.

Further Embodiments

In general, breeding goals associated with development of any plant, including garlic varieties, are: weight, size, leaf color, shape, texture, flavor, earliness, shelf life, resistances against pests and physical disorders, and hybrid production.

Breeding can be accelerated by application of several techniques, including tissue culture for enabling wide crosses and protoplast fusions. Further, significant progress has been made, as for many other vegetable crops, by applying molecular markers. Developing these markers has led to the development of increasingly detailed genetic maps.

These maps contain data from several sources and multiple populations and comprise Quantitative Trait Loci (QTLs), and markers linked to monogenic traits. These markers can be, e.g., RFLP, AFLP, CAPS, RAMP, SSR, microsatellites, and/or SNP markers, which all are well known for persons skilled in the art. Application of these techniques also enables MAS/MARB.

As noted above, one breeding goal in *Allium* is resistance to pests. As with many crops, garlics can be plagued with several physiological problems, like nutrient deficiencies, but also by pests (nematodes, insects, mammals, bacteria, fungi, and/or viruses) and disease caused thereby. Specific examples include bacterial diseases caused by *P. destructor*.

As noted above, knowledge of *Allium* genetics has allowed for extensive mapping of the genome, including 50 genes related to resistance to seven major diseases. Modern molecular techniques also make it possible to stack genes, including genes for *P. destructor* resistance.

It is feasible to introduce traits by cis-genes from *Allium*, or transgenes from any source, encoding novel forms of disease resistance, herbicide resistance, and resistance to pests by, among other techniques, siRNA (host-induced gene silencing), as well as other methods which are common to the person skilled in the art.

These methods include, for example and without limitation, electroporation, *Agrobacterium*-mediated transformation, particle gun transformation, polyethylene glycol (PEG)-mediated protoplast transformation, and silicon whiskers transformation. Further, novel molecular techniques such as CRISPR/Cas9 can be applied for genome editing purposes. These techniques are known to those having ordinary skill in the art.

Introducing resistance to a pest or disease, either by conventional breeding or applying techniques as described above, provides an alternative to application of chemical protectants, which is expensive and also may have a negative impact on the environment, on growers, and on others who work with the crop.

Further Embodiments—Genetic Engineering

With the advent of molecular biological techniques that have allowed the isolation and characterization of genes that encode specific protein products, such as those described above and incorporated by reference, scientists in the field of plant biology have a strong interest in engineering the genome of plants to contain and express foreign genes, or additional, or modified, versions of native, or endogenous, genes (driven by different promoters) in order to alter the traits of a plant in a specific manner. Any DNA sequences, whether from a different species (i.e. transgenes) or from the same species (i.e., cis-genes), which are introduced into the genome using transformation or various breeding methods, are herein collectively referred to as "transgenes." Over the last fifteen to twenty years, several methods for producing transgenic plants have been developed, and the present invention, in particular the embodiments, also relates to transformed versions of the aforementioned varieties. Suitable genetic engineering techniques for transforming, or introducing, traits into the garlic varieties disclosed herein include, for example and without limitation, microinjection, biolistics, electroporation, chemical poration, and transformation using vectors.

Accordingly, provided herein are methods of transforming a plant or plant part of the garlic varieties disclosed herein, or offspring thereof, by any transformation method known to those of skill in the art. A particularly common example of plant transformation involves the construction of an expression vector that will function in plant cells. Such a vector comprises DNA comprising a gene under control of, or operatively linked to, a regulatory element (for example, a promoter). The expression vector may contain one or more operably linked gene/regulatory element combinations. The vector(s) may be in the form of a plasmid, and can be used alone or in combination with other plasmids, to provide transformed plants using transformation methods known to those of skill in the art, to incorporate transgenes into the genetic material of the garlic plant(s).

The garlic variety disclosed herein and offspring thereof can be genetically engineered to express various phenotypes of agronomic interest. Examples hereof are genes that confer resistance to pests and/or herbicides, that confer or contribute to a value-added trait, and that control male sterility. Methods for transforming plants or introducing desired traits are similarly disclosed in International Patent Application Publication No. WO 2014/076249, and in Wijnker et al., "Hybrid recreation by reverse breeding in *Arabidopsis thaliana*," Nature Protocols 2014, 9:761-772, which are incorporated herein by reference in their entirety.

Further Embodiments—Additional Breeding Methods

Also provided herein are methods for producing a garlic plant by crossing a first parent garlic plant with a second parent garlic plant, wherein the first or second parent garlic plant is a garlic variety disclosed herein. Plant breeding techniques, including crossing, thus crossing the garlic varieties disclosed herein with another plant (including the varieties disclosed herein), or with another variety (related or unrelated to the varieties disclosed herein), are well within the skill of the ordinary artisan. Thus, any such methods, e.g., selfing, backcrossing, hybrid production, crosses to populations, and the like, using the garlic varieties disclosed herein should be considered part of this invention. All plants produced using one or more of the garlic varieties disclosed herein as are within the scope of the disclosure, including those developed from varieties derived from the garlic varieties disclosed herein.

In aspects of a breeding method described herein, both first and second parent garlic plants are one or more of the garlic varieties disclosed herein.

In other aspects, the garlic varieties disclosed herein can be used in crosses with other, different garlic plants to produce the first generation (F1) garlic hybrid seeds and plants with superior characteristics. The garlic varieties disclosed herein can also be used for transformation where exogenous genes are introduced and expressed. Genetic variants created either through traditional breeding methods using the garlic varieties disclosed herein or through transformation of the garlic varieties disclosed herein by any of a number of protocols known to those of skill in the art are intended to be within the scope of the present invention.

In one aspect, the method includes the steps of: obtaining the garlic plant, or a part thereof, of one or more of the garlic varieties disclosed herein, utilizing said plant or plant part as a source of breeding material, and selecting a progeny plant with molecular markers in common with one or more of the garlic varieties disclosed herein and/or with morphological and/or physiological characteristics selected from the characteristics of the garlic varieties disclosed herein. Breeding steps that may be used include pedigree breeding, backcrossing, mutation breeding, and recurrent selection. As noted above, such breeding methods are known to those of skill in the art. In conjunction with these steps, techniques such as RFLP-enhanced selection, genetic marker enhanced selection (for example, SSR markers), and the making of double haploids may be utilized.

In another aspect the method includes producing a population of progeny garlic plants of one or more of the garlic varieties disclosed herein, comprising crossing one or more of the garlic varieties disclosed herein with another garlic plant, thereby producing a population of garlic plants, which, on average, derive 50% of their alleles from the garlic varieties disclosed herein. A plant of this population may be selected and repeatedly selfed or sibbed with a garlic plant resulting from these successive filial generations, or may be backcrossed with a recurrent parent (one or more of the garlic varieties disclosed herein). One aspect of this invention is the garlic produced by this method and that has obtained at least 50%, at least 60%, at least 70%, at least 80%, at least 90% or more, all subranges and percentages therebetween inclusive, of its alleles from the garlic varieties disclosed herein.

One of ordinary skill in the art of plant breeding would know how to evaluate the traits of two plant varieties to determine if there is no significant difference between the two traits expressed by those varieties. Thus, the present invention includes progeny of the garlic varieties disclosed herein comprising a combination of at least two traits of the garlic varieties disclosed herein, so that said progeny garlic plant is not significantly different for said traits than the garlic varieties disclosed herein, as determined at the 5% significance level when grown in the same environmental conditions. Using techniques described herein, molecular markers may be used to identify said progeny plant as progeny of one or more of the garlic varieties disclosed herein. Mean trait values may be used to determine whether trait differences are significant, and preferably the traits are measured on plants grown under the same environmental conditions.

The invention claimed is:

1. A seed of garlic variety 'BGS 352,' wherein a representative sample of seed of said variety was deposited under NCIMB Accession No. 43999.

2. A garlic plant, part thereof, or tissue culture produced by growing the seed of claim 1.

3. A tissue culture produced from protoplasts or cells from the garlic plant of claim 2, wherein said cells or protoplasts are produced from a plant part selected from the group consisting of leaf, pollen, embryo, cotyledon, hypocotyl, meristematic cell root, root tip, pistil, anther, ovule, flower, shoot, stem, seed, and petiole.

4. A garlic plant regenerated from the tissue culture of claim 3, wherein the regenerated garlic plant has all of the morphological and physiological characteristics of variety 'BGS 352'.

5. A method for producing a garlic seed comprising crossing two garlic plants and harvesting the resultant garlic seed, wherein at least one of the two garlic plants is the garlic plant of claim 2.

6. The method of claim 5, wherein one of the two garlic plants is a garlic plant that is unrelated to variety 'BGS 352'.

7. A garlic seed produced by the method of claim 5.

8. A garlic plant, part thereof, or tissue culture produced by growing the seed of claim 7.

9. A method of introducing a desired trait into garlic variety 'BGS 352,' comprising:
 (a) crossing a garlic plant of variety 'BGS 352', wherein a representative sample of seed was deposited under NCIMB Accession No. 43999, with a plant of another garlic variety that comprises a desired trait to produce progeny plants, wherein the desired trait is selected from a group consisting of male sterility, herbicide resistance, pest resistance, and resistance to bacterial disease, fungal disease, or viral disease;
 (b) selecting one or more progeny plants that have the desired trait to produce selected progeny plants;
 (c) crossing the selected progeny plants with the garlic plant of variety 'BGS 352' to produce backcross progeny plants;
 (d) selecting for backcross, progeny plants that have the desired trait and all of the physiological and morphological characteristics of garlic variety 'BGS 352'; and
 (e) repeating steps (c) and (d) two or more times in succession to produce selected third or higher backcross progeny plants that comprise the desired trait and all of the physiological and morphological characteristics of garlic variety 'BGS 352'.

10. A garlic plant produced by the method of claim 9, wherein said garlic plant has all of the physiological and morphological traits of variety 'BGS 352'.

11. The garlic plant of claim 10, wherein the desired trait is one or more of herbicide resistance, pest resistance, and male sterility.

12. A seed, plant part, or tissue culture of the garlic plant of claim 10.

13. A method of introducing a desired trait into garlic variety 'BGS 352,' comprising introducing a gene conferring a desired trait into the plant of claim 2.

14. A garlic plant produced by the method of claim 13, wherein said garlic plant has all of the physiological and morphological traits of variety 'BGS 352'.

15. The garlic plant of claim 14, wherein the desired trait is one or more of herbicide resistance, pest resistance, and male sterility.

16. A seed, plant part, or tissue culture of the garlic plant of claim 15.

\* \* \* \* \*